US012617655B2

(12) United States Patent
Husmann

(10) Patent No.: US 12,617,655 B2
(45) Date of Patent: May 5, 2026

(54) ELEVATOR SYSTEM

(71) Applicant: Inventio AG, Hergiswil (CH)

(72) Inventor: Josef Husmann, Lucerne (CH)

( * ) Notice: Subject to any disclaimer, the term of this patent is extended or adjusted under 35 U.S.C. 154(b) by 1211 days.

(21) Appl. No.: 17/310,124

(22) PCT Filed: Feb. 20, 2020

(86) PCT No.: PCT/EP2020/054443
§ 371 (c)(1),
(2) Date: Jul. 19, 2021

(87) PCT Pub. No.: WO2020/173798
PCT Pub. Date: Sep. 3, 2020

(65) Prior Publication Data

US 2022/0048736 A1 Feb. 17, 2022

(30) Foreign Application Priority Data

Feb. 28, 2019 (EP) .................................... 19160054

(51) Int. Cl.
*B66B 7/02* (2006.01)
*B66B 1/24* (2006.01)
*B66B 1/34* (2006.01)
*B66B 9/00* (2006.01)

(52) U.S. Cl.
CPC ................ *B66B 7/026* (2013.01); *B66B 1/24* (2013.01); *B66B 1/3492* (2013.01); *B66B 9/003* (2013.01)

(58) Field of Classification Search
CPC .............................. B66B 9/003; B66B 1/3492
See application file for complete search history.

(56) References Cited

U.S. PATENT DOCUMENTS 3,317,005 A * 5/1967 Kehoe ..................... B66B 9/003 187/249
7,621,376 B2 * 11/2009 Duenser .................... B66B 9/02 187/382

(Continued)

FOREIGN PATENT DOCUMENTS

CN 101896416 A 11/2010
CN 107207212 A 9/2017

(Continued)

*Primary Examiner* — Rina I Duda
(74) *Attorney, Agent, or Firm* — Schlee IP International, PC; Alexander R. Schlee; Pascal A. Schlee

(57) ABSTRACT

An elevator system has an elevator car that can travel vertically along a vertical track including a stationary vertical guide rail, and that can travel horizontally by a car transfer device. The car transfer device has a horizontal displacement unit with a vertical guide rail piece that guides the elevator car in the horizontal displacement unit, the horizontal displacement unit being movable into a transit position in which the guide rail piece and the stationary vertical guide rail together form a section of the vertical track. The elevator system has a connecting device by which, in the transit position of the horizontal displacement unit, the vertical guide rail piece can be connected to the stationary vertical guide rail, wherein, when connected by the connecting device, the vertical guide rail piece cannot be displaced in the horizontal direction with respect to the stationary vertical guide rail.

13 Claims, 3 Drawing Sheets

(56) References Cited

U.S. PATENT DOCUMENTS

| | | | | |
|---|---|---|---|---|
| 8,602,168 | B2 * | 12/2013 | Tschuppert | B66B 9/00 187/249 |
| 9,016,438 | B2 * | 4/2015 | Altenburger | B66B 9/003 187/249 |
| 9,248,994 | B2 * | 2/2016 | Grundmann | B66B 9/003 |
| 9,598,265 | B1 * | 3/2017 | Jacobs | B66B 9/003 |
| 10,351,390 | B2 * | 7/2019 | Gainche | B66B 9/003 |
| 2004/0154870 | A1 * | 8/2004 | Bass | B66B 9/02 187/270 |
| 2010/0133046 | A1 * | 6/2010 | Allwardt | B66B 7/123 187/251 |
| 2011/0132693 | A1 | 6/2011 | Altenburger | |
| 2018/0009633 | A1 | 1/2018 | Fargo et al. | |

FOREIGN PATENT DOCUMENTS

| | | | |
|---|---|---|---|
| CN | 107381287 | A | 11/2017 |
| CN | 107787299 | A | 3/2018 |
| CN | 208361651 | U | 1/2019 |
| DE | 102016222837 | A1 | 5/2018 |
| EP | 1634842 | A2 | 3/2006 |
| EP | 2161233 | A1 | 3/2010 |
| EP | 2219985 | B1 | 8/2010 |
| WO | 2018234177 | A1 | 12/2018 |
| WO | 2018234273 | A1 | 12/2018 |

* cited by examiner

ELEVATOR SYSTEM

FIELD

The invention relates to an elevator system having an elevator car that can travel vertically along a stationary vertical guide rail and can travel horizontally by a car transfer device.

BACKGROUND

EP 2219985 B1 describes an elevator system having a plurality of elevator cars which can be displaced in the vertical direction in two vertical tracks arranged next to each other. Each vertical track has a plurality of self-contained suspension means, which are guided around a lower deflection roller and an upper deflection roller, and has a drive machine in the form of an electric motor assigned to the suspension means. Each elevator car has a controllable coupling device. The suspension means have coupling elements that can be designed, for example, as holes or cams. A coupling device of an elevator car can be coupled to and uncoupled from a coupling element, as a result of which a drive connection between the relevant elevator car and the suspension means can be established and released. An elevator car coupled to a suspension means can thus be displaced along a vertical track by means of the suspension means that can be driven by the drive machine in each case, the elevator car being guided by a stationary vertical guide rail during said displacement. These displacements can be referred to as vertical travel along the vertical track comprising a stationary vertical guide rail.

The elevator cars are moved along one vertical track only upward, and only downward along the other vertical track. In order to be able to realize a circulating operation of the elevator cars, the elevator cars can be moved horizontally between the two vertical tracks by means of car transfer devices. During operation of the elevator system according to EP 2219985 B1, an elevator car is coupled to a suspension means at a lower or an upper end position via the coupling device of said elevator car and a coupling element, and is moved upward or downward via the suspension means by the associated drive machine until it has reached the upper or lower end position. At that position, the elevator car is uncoupled from the suspension means and is moved horizontally into the other vertical track by a car transfer device, in order to then be displaced in the other direction of displacement.

A car transfer device according to EP 2219985 B1 has a horizontal displacement unit with vertical guide rail pieces on which the elevator cars can be temporarily fixed during horizontal travel by means of a braking device. In a so-called transit position of the horizontal displacement unit, an elevator car can be moved into and out of the car transfer device. Associated vertical guide rail pieces and stationary vertical guide rails should be aligned with each other in this case in such a manner that there is no offset and the elevator car can be safely and conveniently moved from a vertical guide rail piece to a stationary vertical guide rail or vice versa. For this purpose, the car transfer device has a centering device, by means of which a frame structure of the horizontal displacement unit can be fixed in the transit position with respect to a horizontal guide.

US 2011/0132693 A1 describes a similarly constructed elevator system having a car transfer device.

SUMMARY

In contrast, it is an object of the invention in particular to propose an elevator system which enables a particularly safe and convenient shaft change of an elevator car. This problem is solved according to the invention by an elevator system having the features described below.

The elevator system according to the invention has at least one elevator car which can travel vertically along a vertical track comprising a stationary vertical guide rail, and can travel horizontally by means of a car transfer device. The car transfer device has a horizontal displacement unit with a vertical guide rail piece that guides the elevator car in the horizontal displacement unit. The horizontal displacement unit can be brought into a transit position in which the guide rail piece of the horizontal displacement unit forms a section of the vertical track together with the stationary vertical guide rail.

According to the invention, the drive system has a connecting device by means of which, in the transit position of the horizontal displacement unit, the vertical guide rail piece of the horizontal displacement unit can be connected to the stationary vertical guide rail. When the vertical guide rail piece is connected to the stationary vertical guide rail by means of the connecting device, the vertical guide rail piece cannot be displaced in the horizontal direction with respect to the stationary vertical guide rail.

The elevator car is guided along the vertical guide rails during displacement and/or when moving into or along the vertical track. The guide rails in particular have a known T shaped cross section; the arms thereof are formed by the foot of the rail, and the trunk thereof is formed by the head of the rail. The head of the rail is oriented in the direction of the elevator car and has at least one running surface. The elevator car has, in particular, a runner which slides or rolls along the running surface of a guide rail. The runner can for example be designed in the form of a guide shoe or guide rollers. A guide rail is usually composed of individual guide rail pieces, such that, especially at the transitions from one guide rail piece to the next guide rail piece, there is a risk that guide rail pieces, in particular their running surfaces, are slightly offset from each other, producing what is known as an offset. If the runner of the elevator car slides or rolls over such an offset, a noticeable jolt can occur, the runner can be damaged or, in the worst case, the runner can jump out of the guide. This risk is particularly great at the transition between a horizontally displaceable, vertical guide rail piece of a horizontal displacement unit of a car transfer device and a stationary vertical guide rail. The connection between the vertical guide rail section of the horizontal displacement unit and the stationary vertical guide rail that is established by the connecting device in the transit position of the horizontal displacement unit ensures optimal alignment of the vertical guide rail section with the stationary vertical guide rail, thereby securing a transition between the two without a step or offset. The vertical guide rail piece and the stationary vertical guide rail are thus optimally aligned with each other, such that the runner of the elevator car can slide or roll over the transition without impairment or damage. This allows for particularly safe and convenient operation of the elevator system.

The elevator system has in particular at least two vertical tracks arranged next to each other and at least two car transfer devices, which are arranged in particular at the upper and lower end of the vertical tracks. In this way, as described above, the elevator cars can be operated in a circulating manner.

The vertical tracks and the car transfer devices are arranged in particular in one or more adjacent elevator shafts, the vertical travel mainly being vertical, i.e., with and against the direction of gravity, and the horizontal journeys mainly being horizontal, i.e., perpendicular to the direction of gravity. A stationary vertical guide rail is to be understood in this case as an immovable, primarily vertically oriented guide rail. The vertical guide rail is in particular fixed, for example bolted, to a shaft wall of the elevator shaft. A vertical track has in particular two opposite vertical guide rails, between which an elevator car can be arranged.

The vertical track is in particular equipped with a car drive system which comprises a flexible suspension means that can be moved and stopped along the vertical track. The elevator car then has a controllable coupling device with which the elevator car can be coupled to and uncoupled from the suspension means.

The car drive system has at least one controllable drive machine, in particular an electric motor, which can move the flexible suspension means and thus displace it in the elevator shaft. The drive machine is in particular controlled by an elevator controller. The elevator controller controls the entire operation of the elevator system; it therefore controls all controllable components of the elevator system and is connected to switches and sensors of the elevator system. The elevator controller can be designed as a single central elevator controller or consist of a plurality of decentralized controllers which are responsible for subtasks. For example, it can have a safety controller which ensures the safe operation of the elevator system.

The suspension means is in particular self-contained, i.e. annular, for example. It can therefore also be referred to as endless. However, this does not necessarily mean that the suspension means is designed as a homogeneous ring or only consists of one piece. The suspension means is in particular guided around a lower deflection roller and an upper deflection roller, at least one deflection roller being used as a drive roller or traction sheave, via which the suspension means can be driven by the drive machine associated therewith. The deflection rollers in particular have an effective diameter of less than 100 mm. Such small effective diameters of a deflection roller being used as a traction sheave allow a gearless drive of the suspension means that requires little installation space. A tensioning device can in particular be arranged on the suspension means, by means of which tensioning device the necessary suspension means pretension is generated and deviations in the original length of the self-contained suspension means and operational plastic length changes in the suspension means are compensated. The required tensioning forces can be generated, for example, by means of tension weights, gas springs or metal springs.

The coupling devices arranged on the elevator car(s) are in particular arranged on a floor or a roof of the elevator cars and are controlled by the elevator controller mentioned above. The coupling to a coupling element of the suspension means in particular takes place in a form-fitting manner, with a frictional coupling also being conceivable. The coupling element in particular has a mainly horizontally oriented recess which an extendable and retractable bolt of the coupling device can enter in an actuation direction, for example. In this case, the coupling device is in the coupled position thereof when the bolt of the coupling device enters the recess of the coupling element, and in the uncoupled position thereof when the bolt does not enter the recess.

A form-fitting or frictional connection between the elevator car and the suspension means can thus be established by the coupling device and the coupling element, such that the elevator car is also moved when the drive means is displaced or moved. A drive connection between the elevator car and the suspension means and thus ultimately between the elevator car and the drive machine associated with the suspension means can thus be established and also released again. The coupling devices are in particular controlled such that only one elevator car is coupled to a (single) suspension means, at least during the movement of an elevator car. In particular, only one (single) elevator car is therefore always moved along the vertical carriageway by a (single) suspension means.

A coupling element of a suspension means is in particular designed as a connecting element which connects two free ends of the suspension means to each other. The use of a self-contained suspension means makes it possible to dispense with a counterweight which has to be guided past the elevator car, which allows the elevator shaft to have a small cross section. In addition, the coupling element designed in this way fulfills a double function. Said coupling element is used to couple the elevator car to the suspension means and to implement the closed suspension means in a simple and cost-effective manner.

The coupling element in particular fulfills the function of what is referred to as a belt joint or a cable connector. A self-contained suspension means can thus be produced very simply, cost-effectively and reliably from an originally open, elongate suspension means by connecting the two free ends to the coupling element. The coupling element can, for example, have two interconnected suspension means end connections, which can be designed, for example, in accordance with EP 1634842 A2. The two suspension means end connections can be connected, for example, via an intermediate piece, to which they can be screwed or welded, for example. The coupling element can also have a single-piece housing.

Instead of a car drive system having a drive machine and a suspension means, the elevator system can also have a car drive system without a suspension means. The car drive system can be designed, for example, as a drive system with a linear drive, or as a friction wheel drive. Such car drive systems are well known. In the following, an elevator system having a car drive system with a drive machine and a suspension means is assumed.

A horizontal displacement unit of a car transfer device has, in particular analogously to the stationary vertical guide rails, two opposite vertical guide rail pieces. The guide rail piece or pieces are shifted horizontally when the elevator car travels horizontally. During the horizontal travel, the elevator car is temporarily fixed on the guide rail piece or pieces. For this purpose, the elevator car has in particular a braking device, by means of which it can clamp to a guide rail piece. It is also possible for the horizontal displacement unit to have a fixing device by means of which the elevator car can be held during horizontal travel, and thus at least indirectly fixed on a guide rail piece. The elevator car is thus guided during horizontal travel.

The horizontal displacement unit has a displacement drive with a drive unit, in particular in the form of an electric motor, by means of which the vertical guide rail piece or pieces, including the elevator car, can be moved horizontally. The drive unit is also controlled by the elevator controller mentioned above.

The horizontal displacement unit and thus the guide rail piece(s) can be brought into a so-called transit position. In the transit position, the vertical guide rail piece(s) of the horizontal displacement unit and corresponding vertical guide rails are arranged relative to each other and/or aligned with each other in such a way that a guide rail piece of the horizontal displacement unit and the stationary vertical guide rail together form a section of the vertical track. In the aforementioned transit position, an elevator car can thus move into or out of a horizontal displacement unit.

When an elevator car changes from a first vertical track to a second vertical track, the horizontal displacement unit is initially in a first transit position in which its vertical guide rail pieces form a section of the first vertical track together with the stationary vertical guide rails of the first vertical track. The guide rail pieces are therefore aligned with the corresponding stationary vertical guide rails in such a way that the elevator car can move into the horizontal displacement unit. After moving into the horizontal displacement unit, the elevator car is fixed to the vertical guide rail pieces, in particular with a braking device. The horizontal displacement unit and thus also the elevator car are then moved horizontally until a second transit position is reached. In the second transit position, the vertical guide rail pieces of the horizontal displacement unit and the stationary vertical guide rails of the second vertical track together form a section of the second vertical track. The elevator car can thus move out of the horizontal displacement unit after the braking device has been released. In this way, the elevator car is also guided by the vertical guide rail piece or pieces when it is moved into the horizontal displacement unit, and when it is moved out of the horizontal displacement unit.

When it is moved in and out as described, the vertical guide rail piece or pieces of the horizontal displacement unit are connected to corresponding stationary vertical guide rails by means of a connecting device. The connection is designed in this case in such a way that a guide rail piece and a corresponding vertical guide rail are aligned with each other in such a way that there is as little of a step or offset as possible. Once the connection is established, the vertical guide rail piece cannot be moved or displaced in the horizontal direction with respect to the stationary vertical guide rail. In this case, the vertical guide rail piece is arranged so that it cannot be displaced in the horizontal direction with respect to the stationary vertical guide rail, and/or is stationary or immovable.

The connecting device is arranged in particular in a region between the vertical guide rails and a shaft wall to which the stationary vertical guide rail is attached. In the case of guide rails with a T-shaped cross section, the connecting device is thus arranged in particular on the rail foot of the guide rails.

In an embodiment of the invention, the connecting device is designed and arranged in such a way that the vertical guide rail piece of the horizontal displacement unit can be positively connected to the stationary vertical guide rail. This allows a particularly secure connection. In addition, the guide rails can be aligned very precisely with each other.

In an embodiment of the invention, the connecting device has a controllable actuator which is arranged on the vertical guide rail piece of the horizontal displacement unit. The actuator is therefore moved together with the vertical guide rail piece. This means that only one actuator per vertical guide rail piece is necessary for all vertical tracks. If the actuator were arranged on the stationary vertical guide rail of a vertical track, several actuators would be necessary for each vertical guide rail piece, namely one actuator per vertical track.

The actuator is designed in particular as an electric motor. However, it can also be designed, for example, as a pneumatic or hydraulic actuator. In particular, the actuator is also controlled by the above-mentioned elevator controller.

In an embodiment of the invention, the connecting device has a bolt which can assume a retracted position and an extended position. The connecting device also has a recess corresponding to the bolt, which is designed and arranged in such a way that, in the transit position of the horizontal displacement unit, the bolt in the extended position enters into the recess and thus the vertical guide rail piece of the horizontal displacement unit is positively connected to the stationary vertical guide rail, and the bolt in the retracted position is distanced from the recess, and thus the vertical guide rail piece of the horizontal displacement unit is horizontally displaceable with respect to the stationary vertical guide rail. A positive connection between a vertical guide rail piece and a corresponding vertical guide rail can thus be established in a simple and inexpensive manner.

The bolt is arranged in particular on the vertical guide rail piece and is actuated in an actuation direction by an actuator arranged on the vertical guide rail piece, that is, it is retracted and extended. In this case, the mentioned direction of actuation runs mainly vertically. A "recess corresponding to the bolt" is to be understood in this context as a recess which has a shape adapted to the bolt, such that when the bolt enters into the recess, only a minimal relative movement transverse to the actuation direction of the bolt, i.e. horizontally, is possible.

In an embodiment of the invention, the bolt has an insertion bevel in the direction of the recess. The bolt can thus be reliably inserted into the recess. This is in particular also the case even if the horizontal displacement unit has not moved exactly into the transit position—that is to say, the vertical guide rail piece is not yet positioned precisely relative to the stationary vertical guide rail. In this case as well, the insertion bevel allows the bolt to be inserted into the recess, and the horizontal displacement unit to be displaced accordingly. In this way, for example, inaccuracies in the positioning of the horizontal displacement unit in the range of a few millimeters, for example 2-3 mm, can be compensated.

An insertion bevel should be understood in this case to mean a tapering of a cross section of the bolt in the direction of the recess. In the case of a cylindrical bolt, the diameter of the bolt decreases in the insertion bevel, such that a conical shape is created.

In an embodiment of the invention, the connecting device has a guide which guides the bolt when moving from the retracted position into the extended position and vice versa. The guide ensures, on the one hand, that the bolt can be safely inserted into the recess and, on the other hand, that the bolt executes an intended movement very precisely.

The guide ensures in particular that the bolt cannot yield transverse to the direction of actuation—that is, in the horizontal direction. A particularly precise alignment of the vertical guide rail piece with respect to the stationary vertical guide rail is thus achieved. The guide is arranged in particular on the vertical guide rail piece. It is designed for example as a metal sheet with a recess through which the bolt protrudes.

In an embodiment of the invention, the elevator system has a sensor device which allows detecting whether the vertical guide rail piece of the horizontal displacement unit is connected to the stationary vertical guide rail. The information captured by the sensor device can advantageously be used for particularly safe operation of the elevator system.

The sensor device has, in particular, a switch that is arranged on the recess of the connecting device and that is actuated by the bolt of the connecting device in the extended position and is not actuated by the bolt in the retracted position. This allows recognizing very simply and inexpensively, and at the same time, reliably, whether the vertical guide rail piece of the horizontal displacement unit is connected to the stationary vertical guide rail.

In an embodiment of the invention, the elevator system has a safety controller that is connected to the sensor device mentioned above, and that is provided to only allow a vertical movement of the elevator car into the horizontal displacement unit and out of the horizontal displacement unit if the aforementioned sensor device detects that the vertical guide rail piece of the horizontal displacement unit is connected to the stationary vertical guide rail. This ensures that the elevator car is only moved into or out of the horizontal displacement unit when the vertical guide rail piece and the stationary vertical guide rail are connected to each other, and thus correctly aligned with each other. This ensures particularly safe operation of the elevator system.

The safety controller can be designed as part of the elevator controller mentioned above, or as a separate control device. It can be integrated into what is known as a safety loop or safety chain of the elevator system, which is known per se.

In an embodiment of the invention, the car transfer device has a displacement drive with a drive unit and a displacement belt. The horizontal displacement unit can be displaced horizontally by means of the displacement drive. A drive connection between the drive unit of the displacement drive and the horizontal displacement unit is established by means of the displacement belt, which is designed as a toothed belt. The design of the displacement belt as a toothed belt ensures a form-fitting and therefore slip-free drive connection between the drive unit and the horizontal displacement unit. The horizontal position of the horizontal displacement unit can thus be safely deduced from the movements, for example rotations, of a drive axle of the drive unit. In this way, the horizontal position of the horizontal displacement unit can be adjusted by means of a controller. This enables a cost-effective design of the displacement drive.

Teeth of the toothed belt consist in particular of an elastomer, the force in the toothed belt being transmitted by a stiff tension cord, which consists for example of glass or aramid fibers. The displacement drive can also have two or more displacement belts connected one behind the other, in which case, in particular, all displacement belts are designed as toothed belts.

In an embodiment of the invention, the car transfer device has a position detection device, by means of which a horizontal position of the horizontal displacement unit within the car transfer device can be detected. The horizontal position of the horizontal displacement unit, and thus also the horizontal position of the vertical guide rail piece or pieces of the horizontal displacement unit, can thus be adjusted particularly precisely. The position can therefore be adjusted in particular by means of a controller.

The position detection device can have one or more position sensors. It can also be designed as a so-called continuous position measuring device, for example in the form of a pull cable sensor. The position detection device can, for example, also be designed as a so-called absolute position detection device, which determines the horizontal position of the horizontal displacement unit from detected markings on the car transfer device. The markings can be arranged, for example, on a so-called longitudinal beam of the car transfer device and captured by means of a camera. Such absolute position detection devices are available in different designs on the market.

Further advantages, features and details of the invention will become apparent from the following description of embodiments and from the drawings, in which identical or functionally identical elements are denoted with identical reference signs. The drawings are merely schematic and not to scale.

DETAILED DESCRIPTION

Figure 1A:
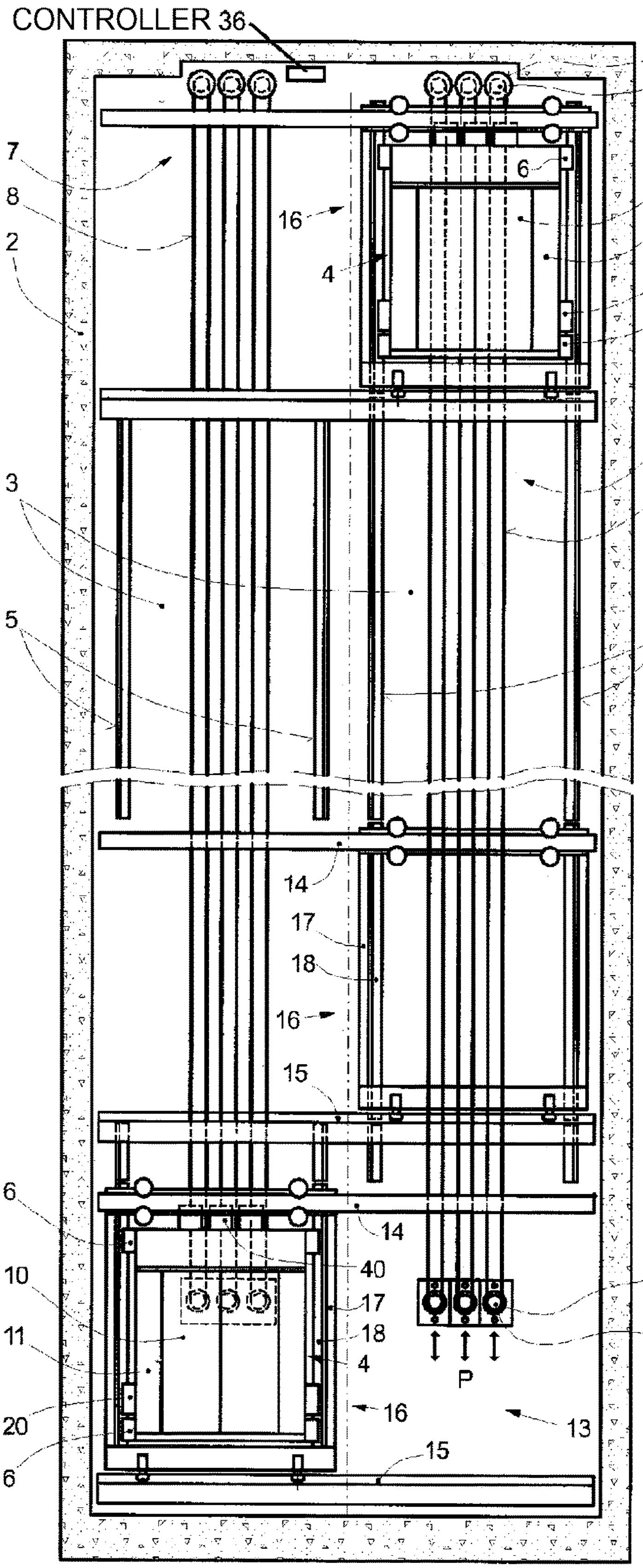
FIG. 1A is a front view of an elevator system with two vertical tracks, two elevator cars and two car transfer devices.
Figure 1B:
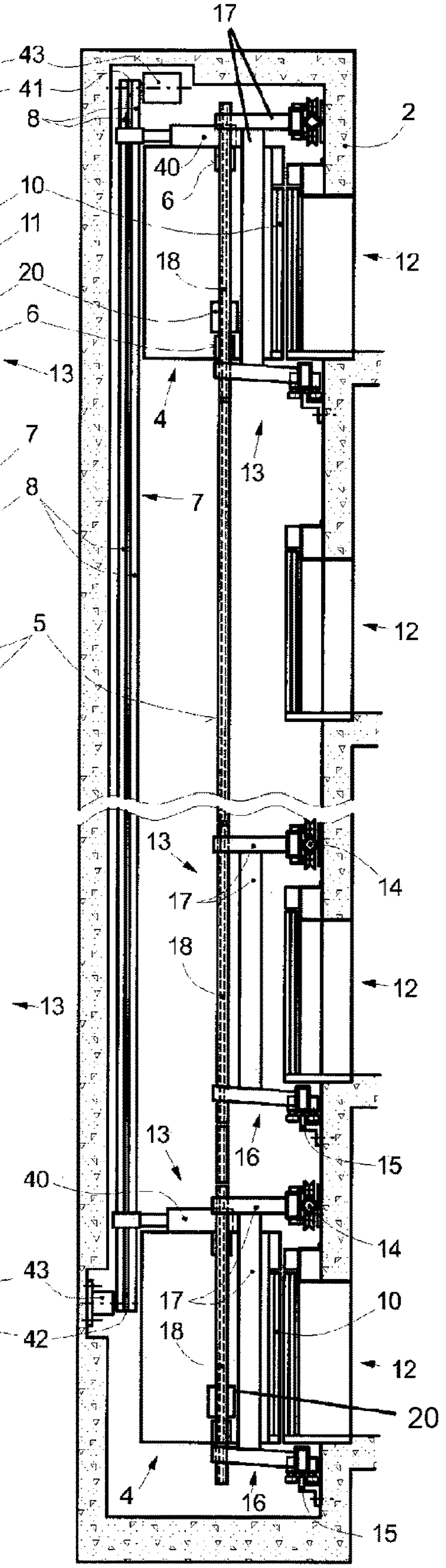
FIG. 1B is a side view of the elevator system according to FIG. 1A.

The elevator system according to FIGS. 1A and 1B has two vertical tracks 3 arranged in an elevator shaft 2 and two elevator cars 4 traveling along these vertical tracks 3. The vertical tracks 3 are each formed by two lines of vertical guide rails 5 fastened in the elevator shaft, and the elevator cars 4 are guided on these vertical guide rails 5 by means of guide shoes 6, with two guide shoes 6 on each side of each elevator car 4. Each vertical track 3 is equipped with three car drive systems 7 with circulating suspension means 8. Each of the elevator cars 4 can be coupled to the suspension means 8 of a car drive system 7 in order to convey the elevator car 4 along a vertical track 3, and can also be decoupled from these suspension means 8 in order to move the elevator car 4 from one vertical track 3 to another. For this purpose, each elevator car 4 is equipped with three controllable coupling devices 40, each of which is assigned to one of the three car drive systems 7. As a variant, each elevator car can also have only a single coupling device, which can be immobile or which, before coupling, is brought into a position corresponding to the currently assigned car drive system by a controlled positioning device.

The vertical tracks 3 are offset from each other parallel to car walls 11 having car doors 10 there arranged. The vertical tracks can also be arranged offset from each other at right angles to the car walls having the car doors.

In normal operation, one of the vertical tracks 3 serves as the track for upward travel and the other as the track for downward travel of the elevator cars 4, each of the elevator cars 4, after reaching a floor level in the terminal region of a vertical track 3, executing a horizontal transfer to the other vertical track 3 in which the elevator car 4 can continue its movement in the opposite direction of travel.

Three car transfer devices 13 are shown, each in the region of a floor stop 12. By means of the car transfer devices, the elevator cars 4 can be displaced between the vertical tracks 3. Each of the car transfer devices 13 comprises two horizontal guides 14, 15 fixed on a door-side wall of the elevator shaft 2, and one horizontal displacement unit 16 that can be displaced along these horizontal guides 14, 15. A horizontal displacement unit 16 of this type comprises a frame structure 17 in which two vertical guide rail pieces 18 are fixed, which form end sections or intermediate sections of the vertical guide rails 5 of the vertical tracks 3 when the horizontal displacement unit 16 is positioned in a corresponding transit position. The frame structure 17 is designed in such a way that the elevator cars 4 can travel in the vertical direction through the horizontal displacement unit 16 or stop therein, in the correct transit position, the elevator cars being guided on the guide rail pieces 18.

The car transfer devices 13 are each equipped with a displacement drive (24 in FIG. 2B), not shown here, which, controlled by an elevator controller 36, displaces the horizontal displacement units 16 between the vertical tracks 3 and positions them in defined transit positions in which the integrated vertical guide rail pieces 18 are precisely aligned with the vertical guide rails 5 of the vertical tracks 3. The horizontal displacement units 16 can be empty or loaded with an elevator car 4 during the displacement process. The displacement drive includes a toothed displacement belt (33 in FIG. 2B) via which a drive unit (32 in FIG. 2B) in the form of a speed-controllable electric motor moves the horizontal displacement units 16 and positions them in a currently required transit position.

Controllable braking devices 20 are attached on both sides of the elevator cars 4, and these interact with the vertical guide rails 5 and with the vertical guide rail pieces 18 of the horizontal displacement units 16 in such a way that the braking devices 20 brake or hold the elevator cars 4 when they are activated by the elevator controller 36, for example. With these braking devices 20, the elevator cars 4 are held on the guide rail pieces 18 integrated in the horizontal displacement units 16 while they are displaced between two vertical tracks 3. The same braking devices 20 can also be used as safety devices which act as safety brakes that are applied between the elevator cars 4 and the vertical guide rails 5 in the event that the permissible car speed or acceleration is exceeded. The same braking devices 20 can also serve as holding brakes which prevent vertical vibrations and height changes in the elevator cars 4 that result from load changes at floor stops. The braking devices 20 usually contain brake pads which are pressed against the vertical guide rails 5 by controllable actuators. Various principles can be used to implement such actuators, for example lifting spindles with torque-controllable drive motors, hydraulic cylinders with pressure control, or electromagnets that attach themselves to the guide rails in the activated state. The braking force generated is preferably regulated as a function of the deceleration of the elevator car 4 measured by a deceleration sensor.

It is easy to see that in the embodiment of the elevator system shown in FIGS. 1A, 1B, in which the vertical tracks are offset from each other parallel to the car walls 11 having the car doors 10, it is also possible for a plurality of vertical tracks 3 to be arranged next to each other. In this embodiment, boarding and exiting takes place at floor stops 12, which can be located on each floor and can be assigned to each of the vertical tracks 3. The horizontal guides 14, 15 of the car transfer devices 13 advantageously extend over the entire width of all vertical tracks, such that each elevator car can use each of the vertical tracks 3. In elevator systems with a relatively large number of parallel vertical tracks, it can be useful to have more than one horizontal displacement unit 16 work on the same horizontal guides 14, 15 of a car transfer device 13 or to arrange two or more car transfer devices directly one above the other. Car transfer devices can also be present at any intermediate level of the elevator system, this intermediate level not necessarily having to be in the region of a floor stop. In combination with a correspondingly designed elevator controller, elevator cars can change their vertical track and optionally their direction of travel via such car transfer devices arranged on intermediate levels, without having to circulate via the terminal regions of the vertical track, or empty elevator cars can be called from parallel vertical tracks without them having to take long detours and waiting times.

Since the vertical guide rails 5 of the vertical tracks 3 are interrupted in the regions of the car transfer devices 13, the elevator controller 36 ensures that a horizontal displacement unit 16 with its guide rail pieces 18 bridges the interruptions before each entry of an elevator car into such a region. If no horizontal displacement unit is available in time for a necessary bridging, the elevator car 4 is stopped before the interrupted region is reached.

Figure 2B:
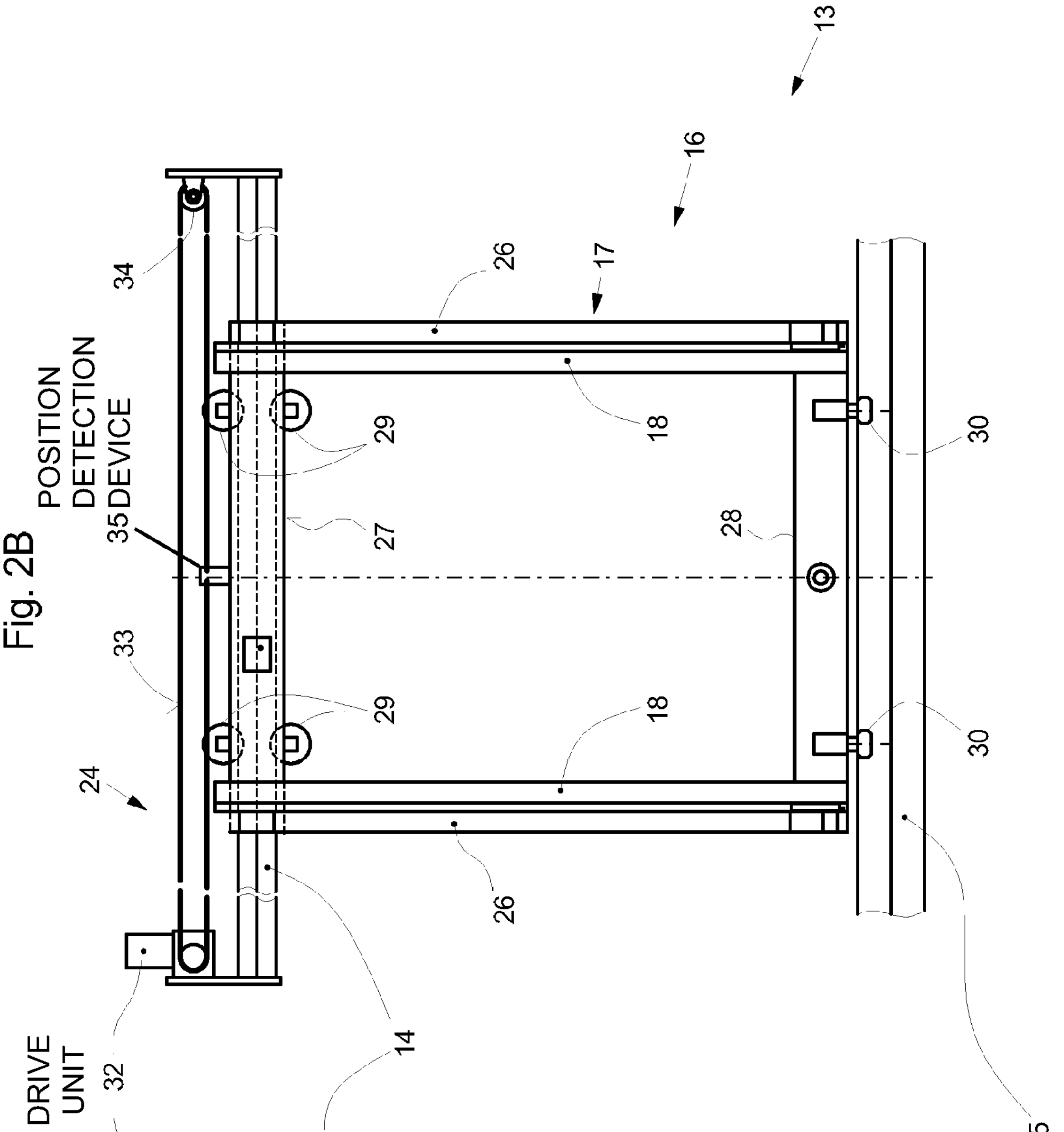
FIG. 2B is a front view of the horizontal displacement device according to FIG. 2A.
Figure 2A:
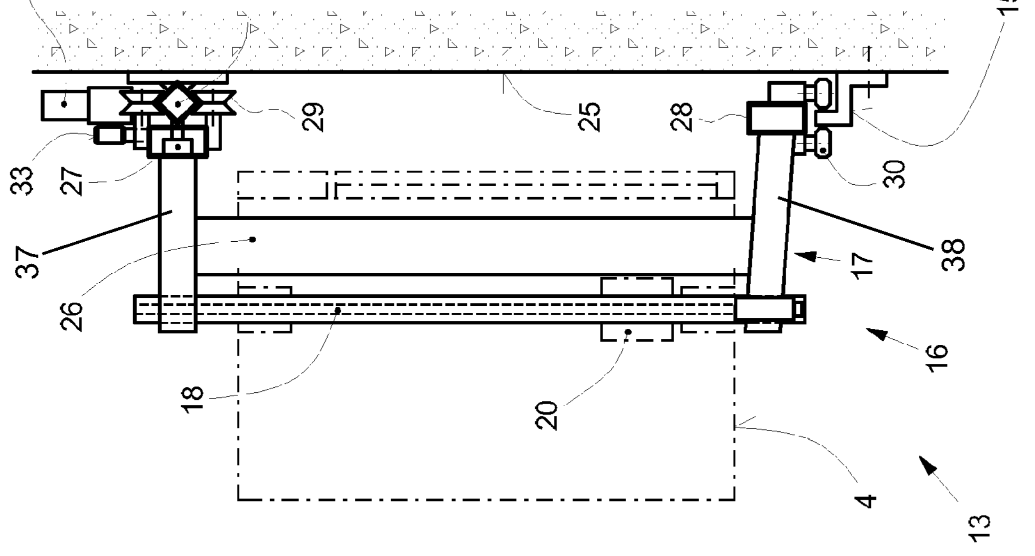
FIG. 2A is a horizontal displacement unit of the car transfer devices, in a side view.

FIGS. 2A and 2B show a side view and a front view of a car transfer device 13 as described above, with its horizontal displacement unit 16, in an enlarged illustration. To illustrate the interaction of the horizontal displacement unit with the elevator cars 4, such an elevator car is indicated by phantom lines in a holding position in the horizontal displacement unit 16. An upper horizontal guide is designated by 14 and a lower horizontal guide by 15; on these, the horizontal displacement unit 16 can be displaced by a displacement drive 24 between the vertical tracks of the elevator system. The horizontal guides 14, 15 are attached to the door-side wall 25 of the elevator shaft. The horizontal displacement unit 16 comprises a frame structure 17 with two vertically arranged lateral frames 26, as well as an upper longitudinal beam 27 and a lower longitudinal beam 28 which connect the two lateral frames 26 to each other via an upper cross member 37 and a lower cross member 38, respectively. Four profiled upper guide rollers 29 with which the upper longitudinal beam 27 is guided in the vertical and horizontal directions on the upper horizontal guide 14 are fixed on the upper longitudinal beam 27. The lower longitudinal beam 28 has four lower guide rollers 30 which guide the lower longitudinal beam 28 in the horizontal direction on the lower horizontal guide 15. The vertically oriented guide rail pieces 18, which have already been mentioned above, are fixed to the inner sides of the two lateral frames 26. The two lateral frames 26, together with the upper and lower longitudinal beams 27, 28, form a U-shaped frame which enables elevator cars 4 to pass vertically between the two lateral frames 26, wherein the two guide rail pieces 18 form terminal sections or intermediate sections of the vertical guide rails 5 of the vertical tracks 3 of the elevator system when the horizontal displacement unit 16 is positioned in a correct transit position. As stated above, the elevator cars 4 are equipped with controllable braking devices 20 with which the elevator cars 4 can be held on the guide rail pieces 18 during a horizontal transfer between two vertical tracks 3.

The displacement drive 24 is arranged above the horizontal displacement unit 16 and comprises a belt drive, which is fastened to the upper horizontal guide 14 and extends over the entire displacement distance, the belt driving have a drive unit 32, a circulating displacement belt in the form of a toothed belt 33, and a pulley 34, wherein the lower strand of the toothed belt is connected to the upper longitudinal beam 27 of the horizontal displacement unit 16.

The drive units 32 of the horizontal displacement units 16 are preferably controlled by the elevator controller 36 (see FIG. 1A) that controls and monitors the entire elevator traffic.

The car transfer device 13 has a position detection device 35 by means of which the horizontal position of the horizontal displacement unit 16 within the car transfer device 13 can be detected. The position detection device 35 is arranged on the upper longitudinal beam 27 of the horizontal displacement unit 16 and detects markings (not shown) on the upper horizontal guide 14. The position detection device 35 can deduce the horizontal position of the horizontal displacement unit 16 from the detected markings. The horizontal position can thus be adjusted very precisely, in particular by means of a controller.

To move and position the elevator cars 4 along their vertical tracks 3, each vertical track 3 is assigned car drive systems 7 that can be controlled independently of each other. These car drive systems 7 enable an asynchronous, i.e., non-coupled movement of a plurality of elevator cars 4 on the same vertical track 3. For this purpose, the elevator cars 4 can be coupled with the aid of controllable coupling devices 40 to flexible suspension means of a car drive system, which are temporarily assigned to the elevator cars 4 by the elevator controller 36. The elevator system can also be equipped with more or fewer than three independent car drive systems.

Each of the shown car drive systems 7 comprises at least one flexible suspension means 8 which can be moved along the assigned vertical tracks 3 and which preferably wraps around a traction sheave 41 in the upper elevator region and a deflection sheave 42 or a second traction sheave in the lower region. Each traction sheave 41 is driven by a drive unit 43, which preferably comprises a speed-controllable electric motor. Each of the drive units 43 or their electric motors assigned to the car drive systems 7 can be controlled and regulated independently of the other drive units 43 belonging to the same vertical track 3. The traction sheaves 41 have a small effective diameter of less than 100 mm, preferably an effective diameter of less than 80 mm. The motor shafts of the electric motors and the associated traction sheaves can form a one-piece unit. The permissible load on a car drive system can be increased by assigning an upper and a lower drive unit, each with a drive pulley, to a car drive system. Such an embodiment is shown in FIGS. 1A, 1B. The electric motors of such drive units are controlled synchronously and speed-regulated synchronously.

The traction sheaves or deflection sheaves in the lower elevator area are equipped in this case with tensioning devices symbolically represented by arrows P, which on the one hand generate the necessary tensioning of the suspension means and on the other hand compensate for deviations in the original lengths of the self-contained suspension means and operational plastic changes in length in the suspension means. The required tensioning forces can be generated, preferably, by means of tension weights, gas springs or metal springs.

The suspension means 8 shown in the elevator systems according to FIGS. 1A, 1B are in the form of belts. These are preferably designed as toothed belts or ribbed V-belts and reinforced with tensile reinforcements in the form of wire ropes, synthetic fiber ropes or synthetic fiber fabrics, such that they can transport an assigned elevator car 4 over a large number of floors without inadmissible vertical vibrations occurring.

As already mentioned above, each elevator car 4 of the illustrated elevator system is equipped with controllable coupling devices 40, which enable the coupling of an elevator car 4 to a temporarily assigned car drive system 7, and of course also enable decoupling from it. Such a coupling device 40 has at least one controllably movable coupling element which interacts positively with openings or cams present on the at least one suspension means of the assigned car drive system in order to create a temporary connection between an elevator car and the suspension means.

Figure 3A:
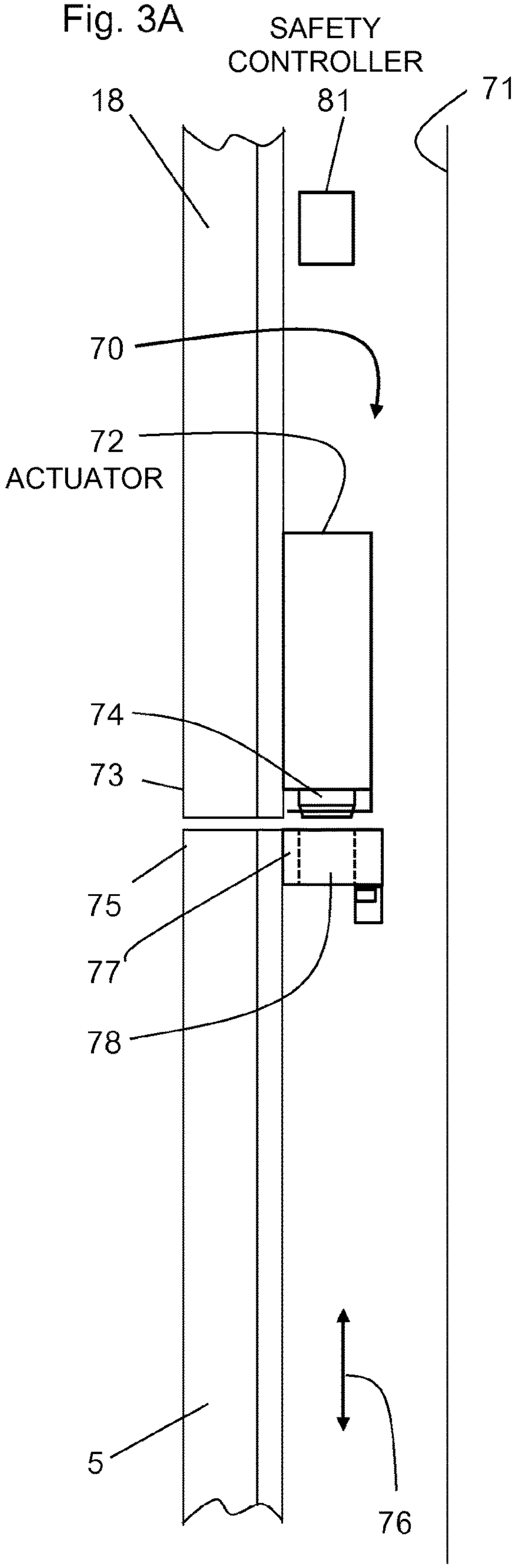
FIG. 3A is a connecting device for connecting a vertical guide rail piece to a stationary vertical guide rail, in an unconnected state.
Figure 3B:
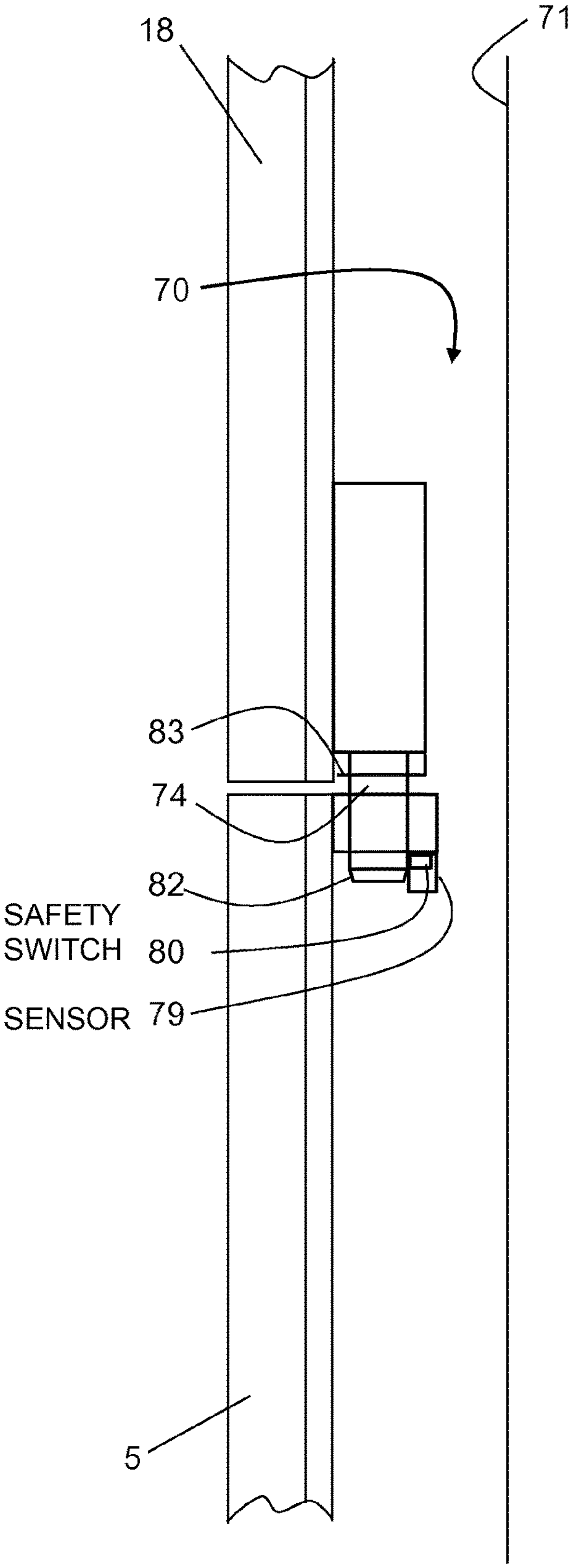
FIG. 3B is the connecting device from FIG. 3A, in a connected state.

As shown enlarged in FIGS. 3A, 3B, the elevator system has a connecting device 70 by means of which the vertical guide rail piece 18 of the horizontal displacement unit 16 can be connected to the stationary vertical guide rail 5 in the transit position of the horizontal displacement unit 16. The connecting device 70 is arranged between the vertical guide rail piece 18 or the stationary vertical guide rail 5 and a shaft wall 71. For this purpose, it is fastened to the rail feet of the two guide rails by fastening means (not shown). The stationary vertical guide rail 5 is fixed to the shaft wall 71 by means of a bracket (not shown).

The connecting device 70 has a controllable actuator 72 in the form of an electric motor, which is arranged on an end 73 of the vertical guide rail piece 18 oriented in the direction of the stationary vertical rail 5. The actuator 72 is controlled by the elevator controller 36 (see FIG. 1A) and can extend a mainly cylindrical bolt 74 in an actuating direction 76, that runs in the vertical direction, into an extended position, and can retract it into a retracted position. In FIG. 3A, the bolt 74 is shown in the retracted position, and in FIG. 3B in the extended position.

A receptacle 77 is arranged on an end 75 of the stationary vertical guide rail 5 oriented in the direction of the vertical guide rail piece 18. The receptacle 77 has a recess 78 in the form of a cylindrical through opening oriented in the actuating direction 76, and thus vertically. An inner diameter of the recess 78 is slightly larger than an outer diameter of the bolt 74, such that the recess 78 can accommodate the bolt 74 with little play. The receptacle 77 and thus the recess 78 are arranged on the stationary vertical guide rail 5 in such a way that, in the transit position of the horizontal displacement unit 16, the bolt 74 is inserted into the recess 78 when changing from the retracted position to the extended position, and thus, as shown in FIG. 3B, enters into the recess 78 in the extended position and establishes a form-fitting connection between the vertical guide rail piece 18 and the stationary vertical guide rail 5. When the bolt 74 enters into the recess 78, the horizontal position of the vertical guide rail piece 18 with respect to the stationary vertical guide rail 5 is fixed. The connecting device 70 is arranged in such a way that in this case the vertical guide rail piece 18 is aligned with respect to the stationary vertical guide rail 5 in such a way that there is no offset or step at the transition.

In the retracted position of the bolt 74 shown in FIG. 3A, it does not enter into the recess 78—that is to say, it has at least a small distance in the actuating direction 76. In the retracted position of the bolt 74, the vertical guide rail piece 18 can thus be displaced in the horizontal direction with respect to the stationary vertical guide rail 5.

On the side of the receptacle 77 opposite the actuator 72, a sensor device 79 with a safety switch 80 is arranged on the recess 78. The safety switch 80 is actuated by the bolt 74 when it assumes the extended position in the recess 78. The sensor device 79 thus detects whether the vertical guide rail piece 18 is positively connected to the stationary vertical guide rail 5 and thus an elevator car 4 can be safely and comfortably moved out of or into the horizontal displacement unit 16. The sensor device 79 is connected to a safety controller 81 by lines not shown. The safety controller 81 can be integrated into the elevator controller 36 or designed as a separate control device and connected to the elevator controller. The safety controller 81 is designed in such a way that it only allows a vertical movement of an elevator car 4 into the horizontal displacement unit 16 and out of the horizontal displacement unit 16 if the sensor device 79 detects that the vertical guide rail piece 18 is connected to the stationary vertical guide rail 5 as described.

In order to allow the bolt 74 to be safely inserted into the recess 78, the bolt 74 has an insertion bevel 82 in the direction of the recess 78, where the outer diameter of the bolt 74 tapers slightly. In the region of the insertion bevel 82, the bolt 74 thus has a conical shape.

In addition, a guide 83 is arranged on the actuator 72, which guides the bolt 74 when it moves from the retracted position into the extended position, and vice versa. For this purpose, the guide 83 has a recess (not visible in FIGS. 3A, 3B) through which the bolt 74 protrudes. An inner contour of the mentioned recess corresponds to an outer contour of the bolt 74, as a result of which it cannot move, or only very little, transverse to the actuating direction 76.

Finally, it must be noted that terms such as "having," "comprising," etc. do not preclude other elements or steps and terms such as "a" or "an" do not preclude a plurality. It must further be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system having an elevator car that travels vertically along a vertical track that includes a stationary vertical guide rail and travels horizontally by a car transfer device, wherein the car transfer device has a horizontal displacement unit with a vertical guide rail piece that guides the elevator car in the horizontal displacement unit, the horizontal displacement unit being movable into a transit position in which the vertical guide rail piece forms a section of the vertical track together with the stationary vertical guide rail, the elevator system comprising:

a connecting device that, when the horizontal displacement unit is in the transit position, is operable to vertically connect the vertical guide rail piece to the stationary vertical guide rail when they are vertically aligned in the transit position; and wherein, when the vertical guide rail piece is connected to the stationary vertical guide rail by the connecting device, the vertical guide rail piece cannot be displaced in a horizontal direction relative to the stationary vertical guide rail.

2. The elevator system according to claim 1 wherein the vertical track includes a car drive system having a flexible suspension means that moves and stops along the vertical track, and the elevator car includes a controllable coupling device adapted to couple to and uncouple from the suspension means.

3. The elevator system according to claim 1 wherein the connecting device is adapted and arranged to connect the vertical guide rail piece to the stationary vertical guide rail through a form-fit connection.

4. The elevator system according to claim 1 wherein the connecting device has a controllable actuator arranged on the vertical guide rail piece for operating the connecting device.

5. The elevator system according to claim 1 wherein the connecting device includes a bolt arranged on the vertical guide rail piece and movable between a retracted position and an extended position, and a receptacle arranged on the stationary vertical guide rail with a recess for receiving the bolt, wherein when the horizontal displacement unit is in the transit position and the bolt is in the extended position, the bolt enters into the recess to positively connect the vertical guide rail piece to the stationary vertical guide rail, and when the bolt is in the retracted position, the bolt is distanced from the recess and the vertical guide rail piece is horizontally displaceable relative to the stationary vertical guide rail.

6. The elevator system according to claim 5 where in the bolt has an insertion bevel directed toward the recess.

7. The elevator system according to claim 5 wherein the connecting device includes a guide that guides the bolt during movements of the bolt between the retracted position and the extended position.

8. The elevator system according to claim 5 including a sensor device detecting whether the vertical guide rail piece is connected to the stationary vertical guide rail, wherein the sensor device includes a switch arranged on the recess, the switch being actuated by the bolt in the extended position and not being actuated by the bolt in the retracted position.

9. The elevator system according to claim 8 including a safety controller connected to the sensor device and allowing a vertical movement of the elevator car into and out of the horizontal displacement unit when the sensor device detects that the vertical guide rail piece is connected to the stationary vertical guide rail.

10. The elevator system according to claim 1 including a sensor device detecting whether the vertical guide rail piece is connected to the stationary vertical guide rail.

11. The elevator system according to claim 1 wherein the car transfer device includes a displacement drive having a drive unit and a displacement belt, wherein the horizontal displacement unit is horizontally displaceable by the displacement drive, and wherein the displacement belt provides a drive connection between the drive unit and the horizontal displacement unit.

12. The elevator system according to claim 11 wherein the displacement belt is a toothed belt.

13. The elevator system according to claim 11 wherein the car transfer device includes a position detection device that detects a horizontal position of the horizontal displacement unit within the car transfer device.

* * * * *